(12) United States Patent
Anson

(10) Patent No.: US 8,286,432 B2
(45) Date of Patent: Oct. 16, 2012

(54) ELECTRIC POWER GENERATING TURBINE ENGINE FUEL SUPPLY SYSTEM

(75) Inventor: Bruce Anson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 995 days.

(21) Appl. No.: 12/277,813

(22) Filed: Nov. 25, 2008

(65) Prior Publication Data

US 2010/0126136 A1    May 27, 2010

(51) Int. Cl.
*F02C 1/00* (2006.01)
(52) U.S. Cl. ........................................ 60/734; 60/39.281
(58) Field of Classification Search ............... 60/39.281, 60/734
See application file for complete search history.

(56) References Cited

U.S. PATENT DOCUMENTS

| | | | |
|---|---|---|---|
| 3,908,360 A | 9/1975 | Meyer et al. | |
| 4,422,289 A | 12/1983 | Langton | |
| 5,184,456 A | 2/1993 | Rumford et al. | |
| 5,245,819 A | 9/1993 | Kast | |
| 6,189,313 B1 | 2/2001 | Cass et al. | |
| 6,237,322 B1 | 5/2001 | Rago | |
| 6,487,847 B1 | 12/2002 | Snow et al. | |
| 6,845,613 B2 | 1/2005 | Shappell et al. | |
| 7,762,080 B2 * | 7/2010 | Anson et al. | 60/772 |
| 2004/0083711 A1 | 5/2004 | Hodinot et al. | |
| 2009/0211558 A1 * | 8/2009 | Anson et al. | 123/497 |

* cited by examiner

*Primary Examiner* — Phutthiwat Wongwian
(74) *Attorney, Agent, or Firm* — Ingrassia Fisher & Lorenz, P.C.

(57) ABSTRACT

A turbine engine fuel supply system includes a priority flow line, a plurality of secondary fuel loads, a fluid-powered metering pump, a mechanically-driven fuel pump, and an electric machine. The fluid-powered metering pump, upon receiving fuel at its fuel inlet, rotates at a rotational speed, discharges the fuel from its fuel outlet at a flow rate dependent on the rotational speed, and supplies a first drive torque. The mechanically-driven fuel pump receives a second drive torque and, in response, draws fuel into its fuel inlet and discharges the fuel from its outlet to the fluid-powered metering pump fuel inlet to drive the fluid-powered metering fuel pump. The electric machine receives the first drive torque from the fluid-powered metering pump and generates electrical power.

20 Claims, 1 Drawing Sheet

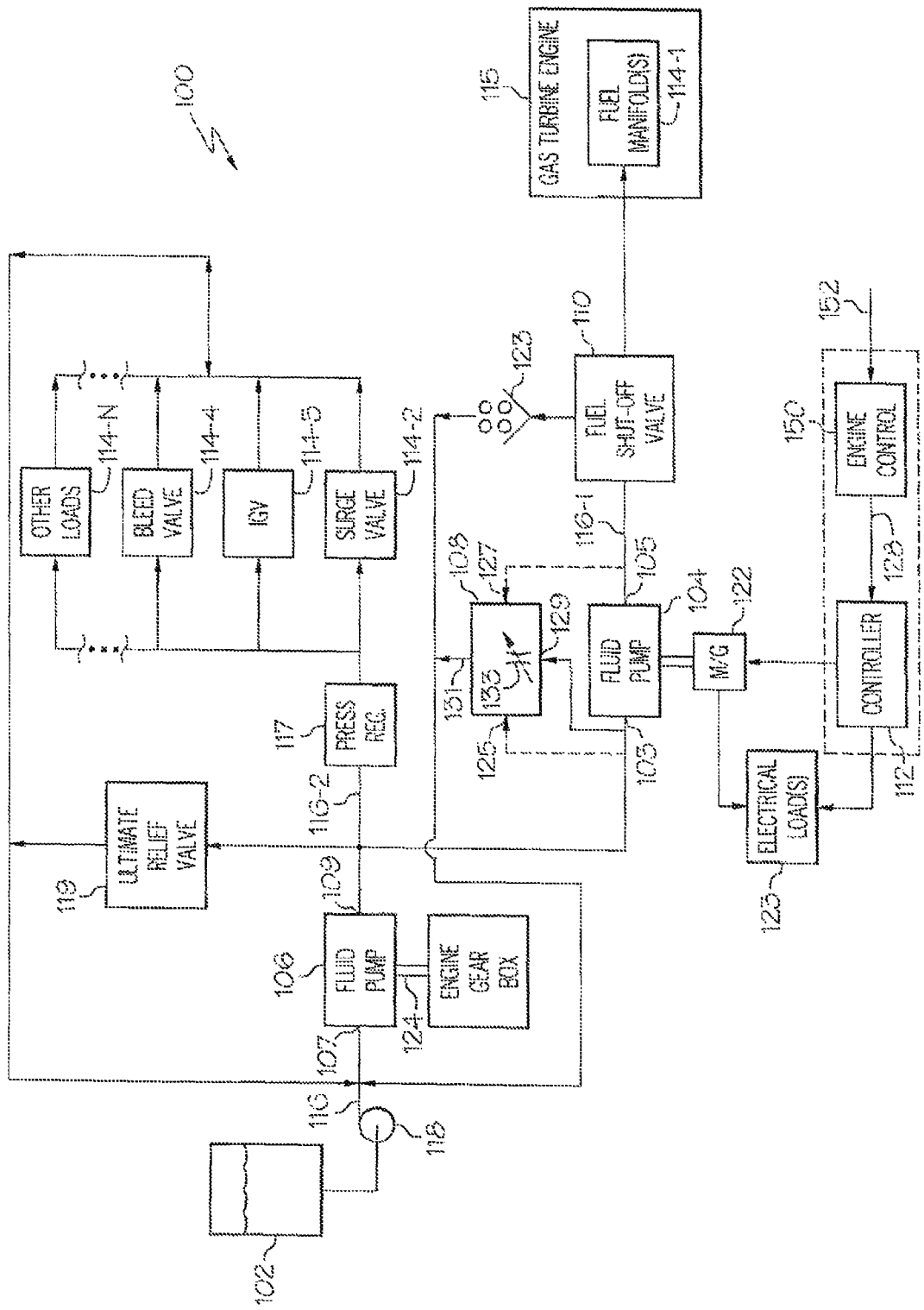

ELECTRIC POWER GENERATING TURBINE ENGINE FUEL SUPPLY SYSTEM

TECHNICAL FIELD

The present invention generally relates to turbine engine fuel supply systems and, more particularly, to a turbine engine fuel supply system that is configured with a pump driven generator that at least selectively generates electrical power.

BACKGROUND

Typical gas turbine engine fuel supply systems include a fuel source, such as a fuel tank, and one or more pumps. The one or more pumps draw fuel from the fuel tank and deliver pressurized fuel to one or more primary fuel loads and to one or more secondary fuel loads via one or more supply lines. Generally, the primary fuel loads, which include the fuel manifolds in the engine combustor, are supplied with fuel via, for example, a priority flow line. The secondary fuel loads, which may include a motive flow valve and regulator, one or more variable geometry actuators, and one or more bleed valves, are supplied with fuel via, for example, a secondary flow line.

Recently, there has been a desire to implement fuel supply systems with electric pumps. In such systems, fuel flow is controlled by, for example, controlling the speed of the electric pump, rather than the position of a metering valve and/or a bypass flow valve. Preferably, the electric pump is sized to supply the maximum fuel flow that may be needed by allow of the system loads. Thus, for systems that include one or more secondary fuel loads, the electric pump may need to be sized to supply a higher flow rate than what is needed by just the primary fuel loads. As a result, the overall fuel system design may exhibit certain undesirable drawbacks. For example, a relatively larger electric pump may generate excessive fuel system heat, and/or may increase overall fuel system weight and costs.

Hence, there is a need for a fuel supply system that uses an electric pump to control fuel flow to one or more primary loads and that is able to supply fuel to secondary fuel loads without generating excessive fuel system heat, and/or increasing overall fuel system weight and/or costs. The present invention addresses one or more of these needs.

BRIEF SUMMARY

In one embodiment, and by way of example only, a turbine engine fuel supply system includes a priority flow line, a plurality of secondary fuel loads, a fluid-powered metering pump, a mechanically-driven fuel pump, and an electric machine. The priority flow line is configured to supply fuel to one or more gas turbine engine fuel manifolds. The fluid-powered metering pump has a fuel inlet and a fuel outlet, and is coupled to receive fuel at its fuel inlet. The fluid-powered metering pump, upon receipt of the fuel at its fuel inlet, rotates at a rotational speed, discharges the fuel from its fuel outlet for supply to the priority flow line at a flow rate dependent on the rotational speed, and supplies a first drive torque. The mechanically-driven fuel pump has a fuel inlet and a fuel outlet. The mechanically-driven fuel pump fuel outlet is in fluid communication with the fluid-powered metering pump fuel inlet. The mechanically-driven fuel pump is adapted to receive a second drive torque and is operable, upon receipt of the second drive torque, to draw fuel into its fuel inlet and discharge the fuel from its outlet to the plurality of secondary fuel loads and to the fluid-powered metering pump fuel inlet to drive the fluid-powered metering fuel pump. The electric machine is connected to receive the first drive torque from the fluid-powered metering pump and is operable, upon receipt thereof, to generate electrical power.

In another exemplary embodiment, a gas turbine engine system includes a gas turbine engine, a plurality of secondary fuel loads, an fluid-powered metering pump, a mechanically-driven fuel pump, and an electric machine. The gas turbine engine includes one or more fuel manifolds and a gearbox. The fluid-powered metering pump has a fuel inlet and a fuel outlet, and is coupled to receive fuel at its fuel inlet. The fluid-powered metering pump, upon receipt of the fuel at its fuel inlet, rotates at a rotational speed, discharges the fuel from its fuel outlet for supply to the one or more fuel loads at a flow rate dependent on the rotational speed, and supplies a first drive torque. The mechanically-driven fuel pump has a fuel inlet and a fuel outlet. The mechanically-driven fuel pump fuel outlet is in fluid communication with the fluid-powered metering pump fuel inlet. The mechanically-driven fuel pump is adapted to receive a second drive torque and is operable, upon receipt of the second drive torque, to draw fuel into its fuel inlet and discharge the fuel from its outlet to the plurality of secondary fuel loads and to the fluid-powered metering pump fuel inlet to drive the fluid-powered metering fuel pump. The electric machine is connected to receive the first drive torque from the fluid-powered metering pump and is operable, upon receipt thereof, to generate electrical power.

In yet another exemplary embodiment, a turbine engine fuel supply system includes a priority flow line, a plurality of secondary fuel loads, a fluid-powered metering pump, a mechanically-driven fuel pump, a differential pressure control valve, an electric machine, an electrical load, and a controller. The priority flow line is configured to supply fuel to one or more gas turbine engine fuel manifolds. The fluid-powered metering pump has a fuel inlet and a fuel outlet, and is coupled to receive fuel at its fuel inlet. The fluid-powered metering pump, upon receipt of the fuel at its fuel inlet, rotates at a rotational speed, discharges the fuel from its fuel outlet for supply to the priority flow line at a flow rate dependent on the rotational speed, and supplies a first drive torque. The mechanically-driven fuel pump has a fuel inlet and a fuel outlet. The mechanically-driven fuel pump fuel outlet is in fluid communication with the fluid-powered metering pump fuel inlet. The mechanically-driven fuel pump is adapted to receive a second drive torque and is operable, upon receipt of the second drive torque, to draw fuel into its fuel inlet and discharge the fuel from its outlet to the plurality of secondary fuel loads and to the fluid-powered metering pump fuel inlet to drive the fluid-powered metering fuel pump. The differential pressure control valve is in fluid communication with the fluid-powered metering pump fuel inlet and the fluid-powered metering pump fuel outlet, and is operable to maintain a constant differential pressure across the fluid-powered metering pump. The electric machine is connected to receive the first drive torque from the fluid-powered metering pump and is operable, upon receipt thereof, to generate electrical power. The electrical load is connected to selectively receive the electrical power generated by the electric machine. The controller is operable to selectively connect and vary the electrical load to thereby control the rotational speed and the flow rate of the fluid-powered metering pump.

Furthermore, other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 1, which is the sole FIGURE, is a simplified schematic diagram of an exemplary embodiment of a hybrid fuel delivery and control system for a gas turbine engine.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although an embodiment of the invention is described as being implemented in an aircraft and for a gas turbine engine, it will be appreciated that the invention may be implemented in numerous and varied end-use environments where fuel flow to primary and secondary fuel loads is controlled.

Turning now to FIG. 1, a simplified schematic diagram of one embodiment of a fuel delivery and control system for a gas turbine engine, such as a turbofan jet aircraft engine, is depicted. The system 100 includes a fuel source 102, a fluid-powered metering pump 104, a mechanically-driven fuel pump 106, a metering pump differential pressure control valve 108, a fuel shut-off valve 110, and a controller 112. The fuel source 102, which is preferably implemented as one or more tanks, stores fuel that is to be supplied to a plurality of fuel loads 114 (e.g. 114-1, 114-2, 114-3, ... 114-N). It will be appreciated that the number and type of fuel loads may vary, and may include one or more gas turbine engine fuel manifolds 114-1, one or more surge valves 114-2, one or more variable geometry actuators 114-3, and one or more bleed valves 114-4, just to name a few. The fuel loads 114 are preferably classified as primary and secondary fuel loads based, for example, on functionality. Though the classifications may vary, the one or more gas turbine engine fuel manifolds 114-1, which are disposed within the combustor zone of a gas turbine engine 115, are typically classified as primary fuel loads. Moreover, the one or more surge valves 114-2, the one or more variable geometry actuators 114-3, and the one or more ejector valves 114-4 are typically classified as secondary fuel loads. Although not depicted as such for clarity, it will be appreciated that one or more of the secondary fuel loads may additionally be disposed within the gas turbine engine 115.

A supply line 116 is coupled to the fuel source 102 and, via the pumps 104, 106, delivers the fuel to the fuel loads 114. It is noted that the supply line 116 is, for convenience, depicted and described as including a priority flow line 116-1 and a secondary flow line 116-2. The priority flow line 116-1 preferably delivers fuel to the primary fuel loads (e.g., 114-1), and the secondary flow line 116-2 preferably delivers fuel to the secondary fuel loads (e.g., 114-2, 114-3, 114-4, ... 114-N). As FIG. 1 further depicts, the system may optionally include a secondary flow line pressure regulator 117 and an ultimate relief valve 119.

The fluid-powered metering pump 104 is positioned in flow-series in the supply line 116, and is preferably a positive displacement pump such as, for example, a fixed displacement, variable speed positive displacement piston pump. The fluid-powered metering pump 104 includes a fuel inlet 103 and a fuel outlet 105 and, as this nomenclature connotes, is driven, at least during normal system 100 operations, by fluid. More specifically, the fluid-powered metering pump 104 is configured to be responsive to fuel supplied to its fuel inlet 103 to rotate and discharge fuel out its fuel outlet 105 and to the priority flow line 116-1. The fluid-powered metering pump 104 is additionally configured to discharge the fuel at a flow rate that is dependent on its rotational speed. The manner in which the rotational speed of the fluid-powered metering pump 104 is controlled will be described further below.

The mechanically-driven fuel pump 106 is also positioned in flow-series in the supply line 116, and includes a fuel inlet 107 and a fuel outlet 109. The mechanically-driven fuel pump 106 draws fuel into its fuel inlet 107 and discharges the fuel, also at a relatively high pressure, via its fuel outlet 107, to the fluid-powered metering pump fuel inlet 103 and to the secondary flow line 116-2. The mechanically-driven pump 106 may be variously implemented, but in the depicted embodiment it includes an input shaft 124 and a fluid pump 126. The input shaft 124 is coupled to, and receives an engine drive torque from, the gas turbine engine 115. Specifically, at least in the depicted embodiment, the input shaft 124 is coupled to the gas turbine engine gearbox 117 and, upon receipt of the engine drive torque, supplies a pump drive torque to the fluid pump 126. The fluid pump 126 is preferably a high pressure pump, such as a positive displacement pump, and is coupled to the input shaft 124. The fluid pump 126 is responsive to the pump drive torque supplied from the input shaft 124 to draw fuel into its fuel inlet 107 and discharge the fuel from its fuel outlet 109 for supply to the fluid-powered metering pump fuel inlet 103 and, via the secondary flow line 116-2, to the plurality of secondary fuel loads 114-2, 114-3, 114-4, ... 114-N. It may thus be appreciated that fuel is supplied to the secondary fuel loads 114-2, 114-3, 114-4, ... 114-N independent of the fluid-powered metering pump 104. It may thus be appreciated that the mechanically-driven pump 106 is sized to supply sufficient fluid power to simultaneously drive the fluid-operated metering pump 104 and the secondary fuel loads 114-2, 114-3, 114-4, ... 114-N.

In the depicted embodiment, the system 100 includes an additional boost pump 118, such as a relatively low horsepower centrifugal pump. The boost pump 118, if included, takes a suction directly on the fuel source 102 and provides sufficient suction head for the fluid-powered metering pump 104 and the mechanically-driven pump 106. It will additionally be appreciated that the boost pump 118 may be either mechanically driven by the engine, or electrically driven by a non-illustrated motor. Moreover, the boost pump 118 may, in some embodiments, not be included. Although not depicted, it will be appreciated that the system 100 may additionally include a low pressure pump within the fuel tank(s) 102 to supply fuel to the boost pump 118.

The metering pump differential pressure control valve 108 is in fluid communication with the fluid-powered metering pump fuel inlet 103 and the fluid-powered metering pump fuel outlet 105, and is configured to maintain a constant differential pressure across the fluid-powered metering pump 104. To do so, the metering pump differential pressure control valve 108 includes at least a first reference port 125, a second reference port 127, an inlet port 129, an outlet port 131, and a variable area flow orifice 133. The first reference port 125 and the inlet port 129 are both in fluid communication with the metering pump fuel inlet 103, the second reference port 127 is in fluid communication with the fuel metering pump fuel outlet 105, the outlet port 131 is in fluid communication with the mechanically driven pump fuel inlet 107, and the variable area flow orifice is in fluid communication between the inlet port 129 and the outlet port 131. The metering pump differential pressure control valve 108, via the first and second reference ports 125, 127, senses the differential pressure across the fluid-powered metering pump 104, and is operable to adjust the area of the variable area flow orifice 133, and thus the flow between the inlet and outlet ports 129, 131, to maintain a substantially constant differential pressure across the fluid-powered metering pump 104. It will be appreciated that in some embodiments the system 100 could be implemented without the metering pump differential pressure control valve 108. However, the reason for including it in the preferred embodiment will be discussed further below.

The fuel shut-off valve 110 is positioned in flow-series in the priority flow line 116-1 downstream of the fluid-powered metering pump 104. More specifically, the fuel shut-off valve 110 is mounted on the priority flow line 116-1 between the fluid-powered metering pump 104 and the one or more fuel manifolds 114-1. The fuel shut-off valve 110, at least in the depicted embodiment, is implemented using a three-way valve, and is movable between a closed position and an open position. As such, the fuel shut-off valve 110 includes an inlet 111 that is in fluid communication with the fluid-powered metering pump outlet 105, an engine outlet 113 that is in fluid communication with the one or more fuel manifolds 114-1, and a return outlet 121 that is in fluid communication with the mechanically-driven fuel pump inlet 107 via a start load valve 123. In the closed position, fuel flow through the fuel shut-off valve 108 and to the one or more fuel manifolds 114-1 is prohibited. Conversely, in the open position, fuel flow through the fuel shut-off valve 108 may occur. It will be appreciated that the fuel shut-off valve 108 may not be included in some embodiments. It will additionally be appreciated that the fuel shut-off valve 108, at least in some embodiments, may include only two flow ports.

As was noted above, the flow rate at which the fluid-powered metering pump 104 supplies fuel is dependent upon its rotational speed. In the depicted system 100, the rotational speed of the fluid-powered metering pump 104 is controlled via an electric machine 122 and one or more electrical loads 123. More specifically, and as may be readily understood, as the fluid-powered metering pump 104 rotates, it generates a drive torque. The electric machine 122 is connected to receive the drive torque from the fluid-powered metering pump 104 and is configured, upon receipt of the drive torque, to generate electrical power. The electric machine 122 is preferably a DC brushless machine that may be operated as either a motor or a generator, though it will be appreciated that it could be implemented as various other types of AC or DC machines that may be operated as both a motor and a generator. It will additionally be appreciated that a plurality of electrical machines 122 could be coupled to the fluid-powered metering pump 104, if needed or desired, to provide redundancy.

The one or more electrical loads 123 are connected to at least selectively receive the electrical power generated by the electric machine 122. For clarity, only a single electrical load 123 is depicted, though it will be appreciated that the system 100 could include a plurality of various electrical loads. Moreover, the one or more electrical loads 123 may be variously implemented. For example, the one or more electrical loads 123 could be implemented as load resistances. Alternatively, a power bus and/or one or more electrical loads on the power bus could implement the one or more electrical loads 123. Moreover, combinations of load resistances and a power bus could also be used.

It was noted above that metering pump differential pressure control valve 108, though optional, is included in the preferred system embodiments. This is because the control laws used to control the speed of the fluid-powered metering pump 104, and thus the fuel flow rate to the engine 115, are relatively easier to implement if a constant (or at least substantially constant) differential pressure is maintained across the fluid-powered metering pump 104. If the differential pressure were not controlled to a constant value, the control laws would be much more complex to implement.

The controller 112 is configured to selectively connect the electrical load 123 to, and to controllably vary the electrical load 123 on, the electric machine 122. In doing so, the controller 112 thereby controls the rotational speed and the flow rate of the fluid-powered metering pump 104. Preferably, the controller 112 is adapted to receive one or more signals 128 representative of a desired fuel flow rate for the one or more engine fuel manifolds 114-1. The controller 112, in response to the command signal 128, controls the electrical load 123 on the electric machine 122 to control the rotational speed of the fluid-powered metering pump 104. It will be appreciated that in some embodiments, the system 100 could be implemented with more than one controller 112, most notably in system embodiments that include more than one electric machine 122.

In addition to the above, the controller 112 may also, at least in some embodiments be configured to selectively control the supply of electrical current to the electric machine 122, to thereby controllably drive the fluid-powered metering pump 104. Preferably, this configuration is implemented during, for example, a start-up of the system 100, when the mechanically-driven fuel pump 106 may not supply sufficient fuel to drive the fluid-powered metering pump 104. During this configuration, the controller 112 is responsive to the command signal 128 to control the current supplied to the electric machine 122 such that it generates a drive torque to drive the fluid-powered metering pump 104. Thereafter, when the mechanically-driven fuel pump 106 is supplying sufficient fuel to drive the fluid-powered metering pump 104, the controller 112 controls the electric machine 122 to operate as a generator.

The system 100, at least in the depicted embodiment, further includes an engine control 150. The engine control 150, which may be implemented as a Full Authority Digital Engine Controller (FADEC) or other electronic engine controller (EEC), controls the flow rate of fuel to the one or more fuel manifolds 114-1. To do so, the engine control 150 receives various input signals and controls the fuel flow rate to the one or more fuel manifolds 114-1 accordingly. In particular, the engine control 150 receives one or more signals 152 representative of a desired fuel flow to be delivered to the one or more engine fuel manifolds 114-1. The engine control 150, in response to the one or more signals 152, automatically generates the above-mentioned command signal 128 that is supplied to the controller 112. It will be appreciated that in some embodiments, as depicted using the dotted line in FIG. 1, the controller 112 and the engine control 150 may be integrated together.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine engine fuel supply system, comprising:
   a priority flow line configured to supply fuel to one or more gas turbine engine fuel manifolds to define a primary fuel load;
   a plurality of secondary fuel loads;
   a fluid-powered metering pump having a fuel inlet and a fuel outlet, the fluid-powered metering pump coupled to receive fuel at its fuel inlet and, upon receipt of the fuel at its fuel inlet, to (i) rotate at a rotational speed, (ii) discharge the fuel from its fuel outlet for supply to the priority flow line at a flow rate dependent on the rotational speed, and (iii) supply a first drive torque;
   a mechanically-driven fuel pump having a fuel inlet and a fuel outlet, the mechanically-driven fuel pump fuel outlet in fluid communication with the fluid-powered metering pump fuel inlet, the mechanically-driven fuel pump adapted to receive a second drive torque and operable, upon receipt of the second drive torque, to draw fuel into its fuel inlet and discharge the fuel from its outlet to the plurality of secondary fuel loads and to the fluid-powered metering pump fuel inlet to drive the fluid-powered metering fuel pump; and
   an electric machine connected to receive the first drive torque from the fluid-powered metering pump and operable, upon receipt thereof, to generate electrical power.

2. The system of claim 1, further comprising:
   a differential pressure control valve in fluid communication with the fluid-powered metering pump fuel inlet and the fluid-powered metering pump fuel outlet, the differential pressure control valve operable to maintain a constant differential pressure across the fluid-powered metering pump.

3. The system of claim 1, further comprising:
   an electrical load connected to selectively receive the electrical power generated by the electric machine; and
   a controller operable to selectively connect and vary the electrical load to thereby control the rotational speed and the flow rate of the fluid-powered metering pump.

4. The system of claim 1, wherein the electrical load comprises one or more resistive loads.

5. The system of claim 1, wherein the electric machine comprises a brushless DC machine.

6. The system of claim 1, further comprising:
   a fuel shut-off valve mounted on the priority flow line, the fuel shut-off valve having at least an inlet and an outlet, the fuel shut-off valve inlet in fluid communication with the fluid-powered metering pump fluid outlet, the fuel shut-off valve movable between an open position, in which fuel discharged from the fluid-powered metering pump fuel outlet flows through the fuel shut-off valve outlet, and a closed position, in which fuel discharged from the fluid-powered metering pump fuel outlet does not flow through the fuel shut-off valve outlet.

7. The system of claim 1, wherein the mechanically-driven pump comprises:
   a fluid pump having a fuel inlet and a fuel outlet, the fluid pump coupled to receive a pump drive torque and operable, upon receipt of the drive torque, to draw fuel into its fuel inlet and discharge the fuel from its fuel outlet for supply to the fluid-powered metering pump fuel inlet and the plurality of secondary fuel loads; and
   an input shaft adapted to be coupled to a gas turbine engine gearbox to receive an engine drive torque therefrom and supply the pump drive torque to the fluid pump.

8. The system of claim 1, wherein the secondary fuel loads comprise:
   a surge valve actuator;
   a bleed valve actuator; and
   a gas turbine engine inlet guide vane actuator.

9. The system of claim 1, further comprising:
   a fuel tank adapted to have the fuel stored therein and in fluid communication with the fluid-powered metering pump fuel inlet and the mechanically-driven fuel pump fuel inlet.

10. The system of claim 9, further comprising:
    a boost pump disposed between the fuel tank and the fluid-powered metering pump fuel inlet and the mechanically-driven fuel pump fuel inlet.

11. A gas turbine engine system, comprising:
    a gas turbine engine including one or more fuel manifolds that define a primary fuel load, and a gearbox;
    a plurality of secondary fuel loads;
    a fluid-powered metering pump having a fuel inlet and a fuel outlet, the fluid-powered metering pump coupled to receive fuel at its fuel inlet and, upon receipt of the fuel at its fuel inlet, to (i) rotate at a rotational speed, (ii) discharge the fuel from its fuel outlet for supply to the one or more fuel loads at a flow rate dependent on the rotational speed, and (iii) supply a first drive torque;
    a mechanically-driven fuel pump having a fuel inlet and a fuel outlet, the mechanically-driven fuel pump fuel outlet in fluid communication with the fluid-powered metering pump fuel inlet, the mechanically-driven fuel pump adapted to receive a second drive torque and operable, upon receipt of the second drive torque, to draw fuel into its fuel inlet and discharge the fuel from its outlet to the plurality of secondary fuel loads and to the fluid-powered metering pump fuel inlet to drive the fluid-powered metering fuel pump; and
    an electric machine connected to receive the first drive torque from the fluid-powered metering pump and operable, upon receipt thereof, to generate electrical power.

12. The system of claim 11, further comprising:
    a differential pressure control valve in fluid communication with the fluid-powered metering pump fuel inlet and the fluid-powered metering pump fuel outlet, the differential pressure control valve operable to maintain a constant differential pressure across the fluid-powered metering pump.

13. The system of claim 11, further comprising:
    an electrical load connected to selectively receive the electrical power generated by the electric machine; and
    a controller operable to selectively connect and vary the electrical load to thereby control the rotational speed and the flow rate of the fluid-powered metering pump.

14. The system of claim 11, wherein the electrical load comprises one or more resistive loads.

15. The system of claim 11, wherein the electric machine comprises a brushless DC machine.

16. The system of claim 11, further comprising:
    a fuel shut-off valve mounted on the priority flow line, the fuel shut-off valve having at least an inlet and an outlet, the fuel shut-off valve inlet in fluid communication with the fluid-powered metering pump fluid outlet, the fuel shut-off valve movable between an open position, in which fuel discharged from the fluid-powered metering pump fuel outlet flows through the fuel shut-off valve outlet, and a closed position, in which fuel discharged from the fluid-powered metering pump fuel outlet does not flow through the fuel shut-off valve outlet.

17. The system of claim 11, wherein the mechanically-driven pump comprises:
- a fluid pump having a fuel inlet and a fuel outlet, the fluid pump coupled to receive a pump drive torque and operable, upon receipt of the drive torque, to draw fuel into its fuel inlet and discharge the fuel from its fuel outlet for supply to the fluid-powered metering pump fuel inlet and the plurality of secondary fuel loads; and
- an input shaft adapted to be coupled to a gas turbine engine gearbox to receive an engine drive torque therefrom and supply the pump drive torque to the fluid pump.

18. The system of claim 11, further comprising:
a fuel tank adapted to have the fuel stored therein and in fluid communication with the fluid-powered metering pump fuel inlet and the mechanically-driven fuel pump fuel inlet.

19. The system of claim 18, further comprising:
a boost pump disposed between the fuel tank and the fluid-powered metering pump fuel inlet and the mechanically-driven fuel pump fuel inlet.

20. A turbine engine fuel supply system, comprising:
- a priority flow line configured to supply fuel to one or more gas turbine engine fuel manifolds to define a primary fuel load;
- a plurality of secondary fuel loads;
- a fluid-powered metering pump having a fuel inlet and a fuel outlet, the fluid-powered metering pump coupled to receive fuel at its fuel inlet and, upon receipt of the fuel at its fuel inlet, to (i) rotate at a rotational speed, (ii) discharge the fuel from its fuel outlet for supply to the priority flow line at a flow rate dependent on the rotational speed, and (iii) supply a first drive torque;
- a mechanically-driven fuel pump having a fuel inlet and a fuel outlet, the mechanically-driven fuel pump fuel outlet in fluid communication with the fluid-powered metering pump fuel inlet, the mechanically-driven fuel pump adapted to receive a second drive torque and operable, upon receipt of the second drive torque, to draw fuel into its fuel inlet and discharge the fuel from its outlet to the plurality of secondary fuel loads and to the fluid-powered metering pump fuel inlet to drive the fluid-powered metering fuel pump;
- a differential pressure control valve in fluid communication with the fluid-powered metering pump fuel inlet and the fluid-powered metering pump fuel outlet, the differential pressure control valve operable to maintain a constant differential pressure across the fluid-powered metering pump;
- an electric machine connected to receive the first drive torque from the fluid-powered metering pump and operable, upon receipt thereof, to generate electrical power;
- an electrical load connected to selectively receive the electrical power generated by the electric machine; and
- a controller operable to selectively connect and vary the electrical load to thereby control the rotational speed and the flow rate of the fluid-powered metering pump.

* * * * *